(12) United States Patent
Cmich

(10) Patent No.: US 12,220,940 B2
(45) Date of Patent: Feb. 11, 2025

(54) LOW IMPACT TURF WHEEL AND WHEEL CLEANING SYSTEM

(71) Applicant: MTD PRODUCTS INC, Valley City, OH (US)

(72) Inventor: Ryan Cmich, Sharon Township, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 18/116,560

(22) Filed: Mar. 2, 2023

(65) Prior Publication Data

US 2023/0202228 A1 Jun. 29, 2023

Related U.S. Application Data

(62) Division of application No. 16/881,522, filed on May 22, 2020, now Pat. No. 11,919,331.

(Continued)

(51) Int. Cl.
*B60B 15/08* (2006.01)
*B60B 15/02* (2006.01)
*B60S 1/68* (2006.01)

(52) U.S. Cl.
CPC ............ *B60B 15/08* (2013.01); *B60B 15/026* (2013.01); *B60S 1/68* (2013.01); *B60B 2900/111* (2013.01);
(Continued)

(58) Field of Classification Search
CPC ......... B60B 15/08; B60B 15/026; B60S 1/68; A01D 34/003
See application file for complete search history.

(56) References Cited

U.S. PATENT DOCUMENTS 1,763,984 A * 6/1930 Raby .................... B60S 1/68
280/856
1,837,946 A * 12/1931 Bosch .................. B60S 1/68
280/855
(Continued)

FOREIGN PATENT DOCUMENTS

AT 42352 B 5/1910
BE 1009522 A3 4/1997
(Continued)

OTHER PUBLICATIONS

Zucchetti Centro Sistemi; Workshop Manual Lawn Mower Robots dated Jan. 1, 2016; entire document.
(Continued)

*Primary Examiner* — S. Joseph Morano
*Assistant Examiner* — Emily G. Castonguay
(74) *Attorney, Agent, or Firm* — Wegman Hessler Valore

(57) ABSTRACT

A turf wheel having a wheel rim having an inner and outer surface, and an annular tread portion; a plurality of projections extending radially outward from the outer surface of the wheel rim, wherein each projection provides a stem, a ground contacting pad, and a ground engaging lug; and a hub. A wheel cleaning system having a frame provided by a wheeled apparatus; at least one turf wheel mounted to the frame; a turf wheel scraper assembly, the turf wheel scraper assembly providing a turf wheel scraper and an attachment mechanism, where the attachment mechanism is adapted to be mounted to the frame, and couples the turf wheel scraper to the frame.

16 Claims, 17 Drawing Sheets

Related U.S. Application Data

(60) Provisional application No. 62/852,857, filed on May 24, 2019.

(52) U.S. Cl.
CPC ... *B60B 2900/112* (2013.01); *B60B 2900/212* (2013.01)

(56) References Cited

U.S. PATENT DOCUMENTS

| | | | |
|---|---|---|---|
| 3,241,887 A | | 3/1966 | Winters |
| 3,630,257 A | | 12/1971 | Goldberger |
| 3,650,185 A | | 3/1972 | Takata |
| 3,907,370 A | | 9/1975 | Bard |
| 4,059,229 A | | 11/1977 | Pescetto |
| 4,818,040 A | * | 4/1989 | Mezzancella ............ B60S 1/68 305/110 |
| 5,297,497 A | * | 3/1994 | Schmidt ................... B60S 1/68 111/135 |
| 5,906,090 A | | 5/1999 | Knudsen |
| 6,334,630 B1 | | 1/2002 | Barros, Sr. |
| 7,198,333 B1 | | 4/2007 | Freeman |
| RE43,381 E | | 5/2012 | Brockway |
| D794,089 S | | 8/2017 | Maibach et al. |
| 10,507,804 B1 | * | 12/2019 | Chandler ............. E02D 3/0265 |
| 10,730,344 B2 | | 8/2020 | Cmich |
| 10,899,171 B2 | | 1/2021 | Cmich |
| 2014/0047812 A1 | | 2/2014 | Johansson et al. |
| 2015/0314643 A1 | | 11/2015 | Lewis |
| 2021/0094346 A1 | | 4/2021 | Cmich |

FOREIGN PATENT DOCUMENTS

| | | |
|---|---|---|
| CN | 201980011 U | 9/2011 |
| EP | 1731010 A1 | 12/2006 |
| EP | 2258455 A1 | 12/2010 |
| EP | 2279880 A2 | 2/2011 |
| EP | 2987646 A1 | 2/2016 |
| GB | 2467956 A | 8/2010 |
| GB | 2513113 A | 10/2014 |
| KR | 20120132088 A | 12/2012 |
| WO | 2019108505 A1 | 6/2019 |

OTHER PUBLICATIONS

Gailco Innovations; Mow Aerator dated Nov. 5, 2008; entire document.
International Search Report and Written Opinion of International Application No. PCT/US20/034255 dated Oct. 13, 2020, 14 pages.

* cited by examiner

LOW IMPACT TURF WHEEL AND WHEEL CLEANING SYSTEM

CROSS-REFERENCE TO RELATED APPLICATIONS

This application is a divisional of application Ser. No. 16/881,522, filed May 22, 2020, which claims the benefit of U.S. Provisional Application No. 62/852,857, filed May 24, 2019, the entirety of both of which are herein incorporated by reference.

FIELD OF THE INVENTION

The disclosed technology is generally directed to a low impact turf wheel and wheel cleaning system. The disclosed technology relates to a low impact turf wheel that significantly reduces the adverse effects of frequent travel over an area of turf by a turf wheel and provides resistance to build-up.

BACKGROUND OF THE INVENTION

Wheel marks and ruts in an area of turf that has been traversed are unsightly and undesirable. During operation, wheels carrying the full weight of a wheeled apparatus compress the turf and/or grass blades downward towards the underlying soil. The influence of the wheels may damage the underlying turf and create wheel marks, as well as leave behind build-up or unsightly clumps of turf material that may accumulate on the surface of a wheel or wheel tread as it traverses various conditions of an area of turf. In order to maintain large areas, many applications require a wheeled apparatus that can operate in all weather conditions, (i.e. rain or shine). When operating in wet conditions, conventional tread wheels tend to collect cut grass, turf or debris in the form of a continuous band of material that builds up around the circumference.

Over extended periods of time, these bands or clumps of turf material are known to become quite large, which will separate from the wheel leaving an objectionable clump of material on the lawn or turf surface and/or can adversely affect the performance of a wheeled apparatus. Such build-up around a wheel will lead to a loss of traction, and in some instances, the wheel will be unable to provide enough traction, thus causing the wheeled apparatus to become stuck or unable to move through an area of turf.

SUMMARY OF THE INVENTION

The disclosed technology generally described hereinafter provides for a low impact turf wheel and wheel cleaning system which provides for resistance to build-up.

According to one aspect of the disclosed technology, a low impact turf wheel is disclosed. The turf wheel comprises a wheel rim having an outer surface, and an annular tread portion; a plurality of projections extending radially outward from the outer surface of the wheel rim, wherein the plurality of projections maintain the wheel rim above an area of turf; and a hub.

In some embodiments, the plurality of projections provide a ground contacting pad. In some embodiments, the ground contacting pads comprise less than about 75% of the annular tread portion. In some embodiments, the ground contacting pads comprise between about 30% to 35% of the annular tread portion. In some embodiments, the ground contacting pads comprise between about 10% to 50% of the annular tread portion. In some embodiments, the plurality of projections are evenly distributed about the outer surface of the wheel rim.

According to yet another aspect of the disclosed technology, a turf wheel is provided. The turf wheel comprises a wheel rim having an outer surface, and an annular tread portion; and a plurality of projections extending radially outward from the outer surface of the wheel rim, wherein each projection comprises a stem, a ground contacting pad, and a ground engaging lug.

In some embodiments, the stem extends perpendicularly from the wheel rim. In some embodiments, the ground contacting pad creates an overhang extending perpendicularly outward from the stem. In some embodiments, the overhang prevents build-up of turf material on or around the stem. In some embodiments, the plurality of projections maintain the wheel rim above an area of turf. In some embodiments, the ground contacting pads comprise between about 10% to 75% of the annular tread portion.

According to yet another aspect of the disclosed technology, a turf wheel is provided. The turf wheel comprises a wheel rim having an outer surface, and an annular tread portion; and a plurality of projections extending radially outward from the outer surface of the wheel rim, wherein the plurality of projections maintain the wheel rim above an area of turf and provide a non-continuous tread, the non-continuous tread comprising a plurality of ground contacting pads and a plurality of tread voids.

In some embodiments, the ground contacting pads comprise about 30% and the tread voids comprise about 70% of the annular tread portion. In some embodiments, each projection further comprises stem and a ground engaging lug, wherein the ground engaging lug includes a limited surface area of which to engage an area of turf. In some embodiments, the turf wheel further comprising a contact surface ratio of about 1:3, wherein the contact surface ratio is the ratio of the ground contacting pad to the annular tread portion.

According to yet another aspect of the disclosed technology, a wheel cleaning system is provided. The wheel cleaning system comprises a frame provided by a wheeled apparatus; at least one turf wheel mounted to the frame; a turf wheel scraper assembly, the turf wheel scraper assembly having a turf wheel scraper and an attachment mechanism, wherein the attachment mechanism is adapted to be mounted to the frame, and couples the turf wheel scraper to the frame.

In some embodiments, the at least one turf wheel comprises a non-continuous tread having a plurality of projections and a plurality of tread voids. In some embodiments, the turf wheel scraper assembly is configured to continuously remove debris from the turf wheel during rotation of the wheel. In some embodiments, the turf wheel scraper is configured to contour the plurality of projections. In some embodiments, the turf wheel scraper passes through the plurality of tread voids. In some embodiments, each projection comprises a stem, a ground contacting pad, and a ground engaging lug. In some embodiments, the turf wheel scraper is configured to contour the ground contacting pad and the ground engaging lug. In some embodiments, the turf wheel scraper is shaped such that it is able to pass over and around the ground engaging lug, and down an interior portion of the stem during rotation of the wheel.

BRIEF DESCRIPTION OF SEVERAL VIEWS OF THE DRAWINGS

These and other features of the disclosed technology, and the advantages, are illustrated specifically in embodiments now to be described, by way of example, with reference to the accompanying diagrammatic drawings, in which.

Figure 1:
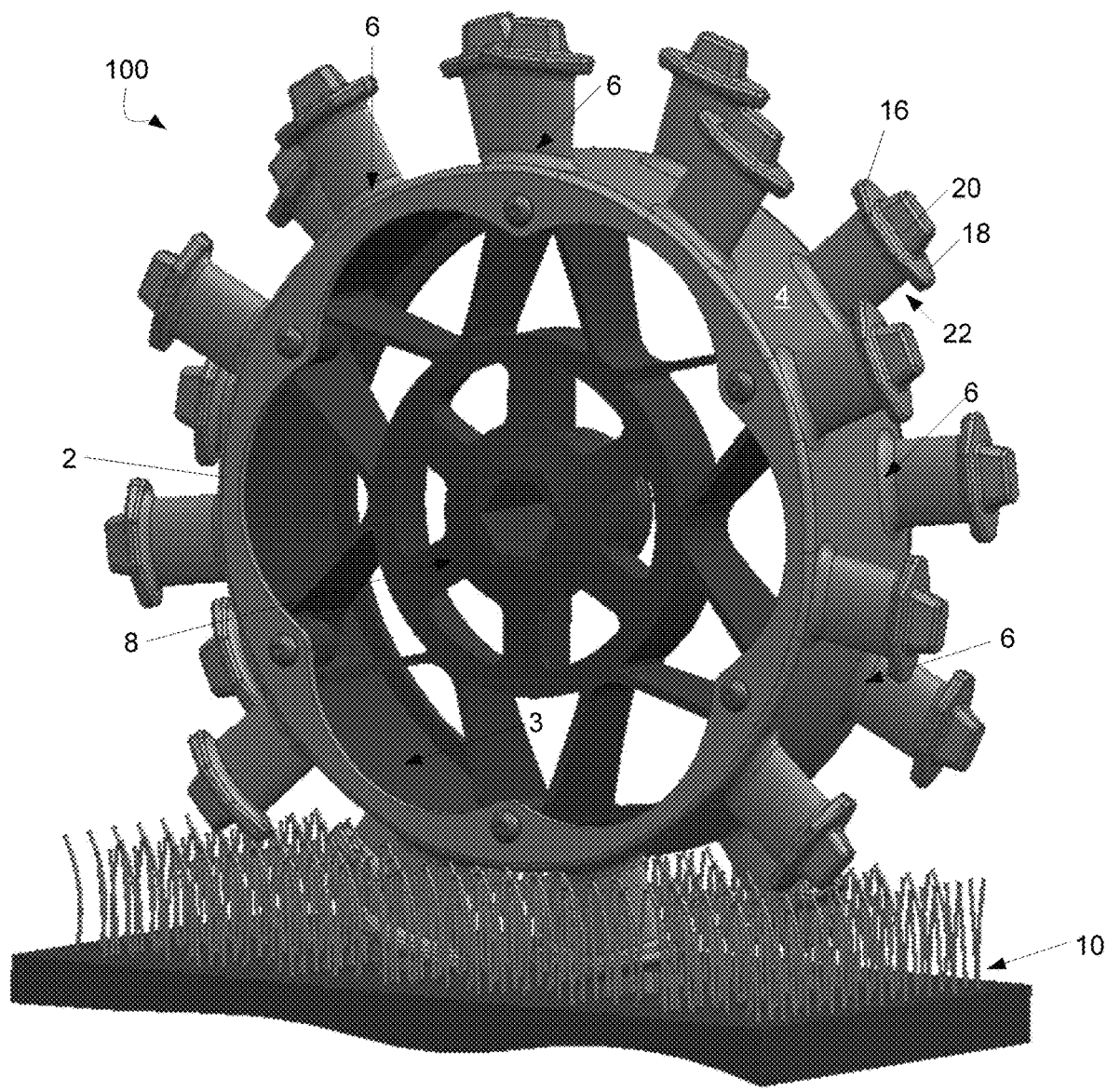
FIG. 1 is a partial rotated view of an illustrative embodiment of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION OF THE EMBODIMENTS

The following terms are used throughout the description, the definitions of which are provided herein to assist in understanding various aspects of the subject disclosure.

As used herein, the terms "low impact turf wheel", "turf wheel" and "wheel" are used interchangeably and refer to a wheel on most any type of wheeled apparatus or mower.

As used herein, the terms "robot mower", "robotic mower" and "autonomous mower" are used interchangeably and refer to most any mower.

As used herein, the terms "turf", "turf material", and "material" are used interchangeably and refer to most any type of grass or turf, soil and the grass/plant material contained therein, grass or turf clippings, wet, moist or damp grass or turf, leaves, small plants or branches, dirt, debris and/or mud.

As used herein, the term "area of turf" refers to numerous types and varieties of grasses, such as those used on lawns, athletic fields, sports fields, and/or other soil, landscape or terrain.

The disclosed technology generally described hereinafter provides for a low impact turf wheel 100. With existing products, and contrast to the disclosed technology, once traversed, the tracks left in an area of turf by wheels are typically visible for an hour or more, depending upon the condition of the turf. In some instances, such as with a robotic mower that mows in a random pattern, such tracks can be objectionable to users and should be avoided. This effect is worsened when the soil is very wet, as the turf which is laid down by the wheels becomes coated in mud, making the track marks much more evident and pronounced.

As such, the low impact turf wheel 100 disclosed herein significantly reduces the adverse effects of frequent travel over turf by a wheeled apparatus. The features described herein reduce the long-term damage to areas of very high traffic (e.g. on-wire and in front of a charge station in autonomous mower applications), and also reduce the short-term cosmetic effects that accompany conventional wheels used on existing products.

With reference to FIG. 1, a low impact turf wheel 100 is shown. The low impact turf wheel 100 comprises a wheel rim 2 having an inner surface 3 and an outer surface 4, a plurality of projections 6, and a hub 8. The plurality of projections 6 extend radially outward from the outer surface 4 of the wheel rim 2. The low impact turf wheel 100 is structured and operable to allow turf to pass through the plurality of projections 6 yet maintain the wheel rim 2 above an area of turf. Thus, the wheeled apparatus can roll across an area without flattening, compressing or compacting the turf against the ground.

The low impact turf wheel 100 may be an integrally-formed, one-piece member. It should be understood that the low impact turf wheel 100 can be formed of most any material sufficient to be rigid enough to provide support to a wheeled apparatus, while also being substantially lightweight. In some embodiments, the low impact turf wheel 100 is made in one piece. In other embodiments, the wheel rim 2 is formed separately from the hub 8, wherein the wheel rim 2 and the hub 8 are attached or fixedly-attached to each other to form the turf wheel 100.

The wheel rim 2 is substantially circular, having an inner surface 3 and an outer surface 4. The wheel rim 2 has a diameter and a circumference, where the outer surface 4 extends circumferentially about the wheel rim circumference. The plurality of projections 6 are located on and extend radially outward from the outer surface 4 of the wheel rim 2. In some embodiments, the plurality of projections 6 are evenly distributed about the outer surface 4 of the wheel rim 2.

Figure 2:
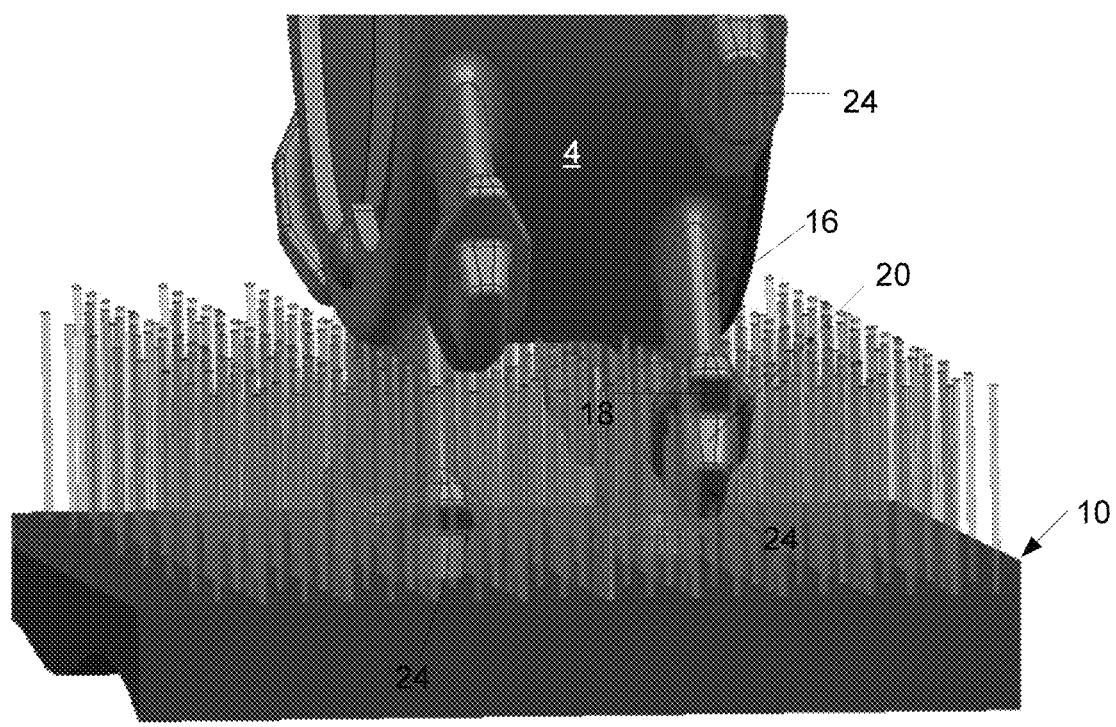
FIG. 2 is a schematic of an illustrative embodiment of the disclosed technology.

As shown in FIG. 2, the plurality of projections 6 are employed to maintain the outer surface 4 of the wheel rim 2 above an area of turf 10. To maintain the outer surface of the wheel rim above an area of turf should be understood to mean that the plurality of projections 6 support the outer surface 4 of the wheel rim 2 in a position above the turf, so as it does not compress an area of turf, or where the outer surface 4 does not come in direct contact with the ground.

The plurality of projections 6 allow for grass and/or turf to brush up against the outer surface 4 and to pass through the plurality of projections 6, yet maintain the outer surface 4 of the wheel rim 2 above the turf, without flattening, compressing, or compacting an area of turf against the ground, or damaging the individual grass stems or an area of turf. This minimizes the influence of the wheels (i.e. prevents crushing, flattening, breakage, etc.) on the grass stems and/or turf area, which minimizes damage and ultimately prevents or reduces wheel marks and strips of uncut grass, indicative of the traveling path of a wheel apparatus caused during operation.

It should be understood that the plurality of projections 6 can be formed of the same or different material than that which comprises the wheel rim 2. It should also be understood that the size and quantity of projections 6 is a function of the wheel rim 2 diameter, the mass of the object being supported (e.g. a robotic mower), and the composition of the area of turf where the low impact turf wheel 100 will be operating.

Figure 4A:
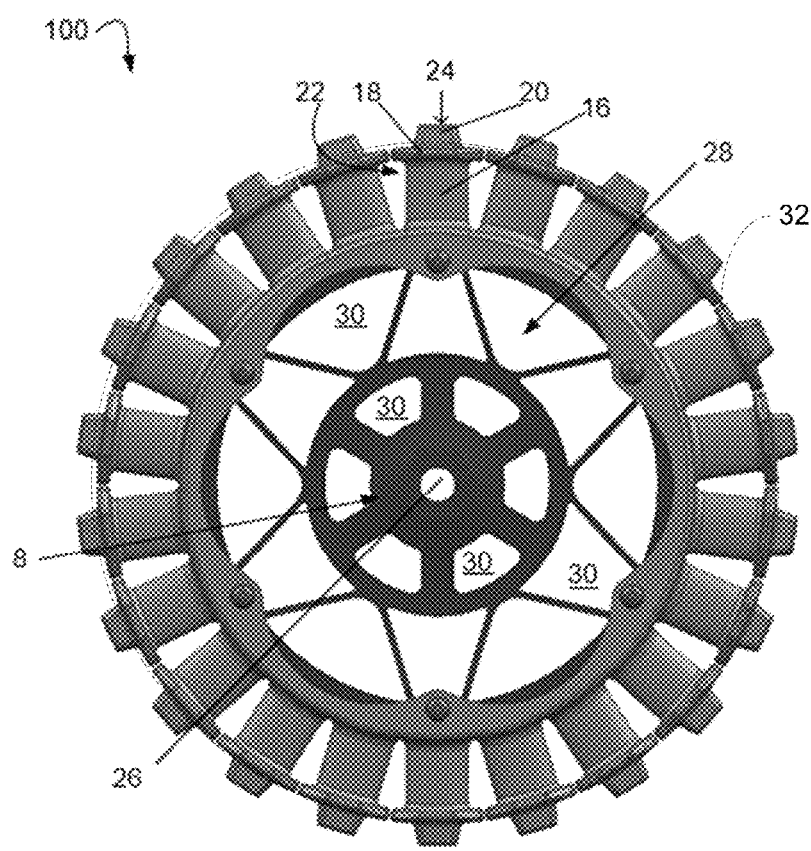
FIGS. 4A-4B are front and side views, respectively, of an illustrative embodiment of the disclosed technology.
Figure 4B:
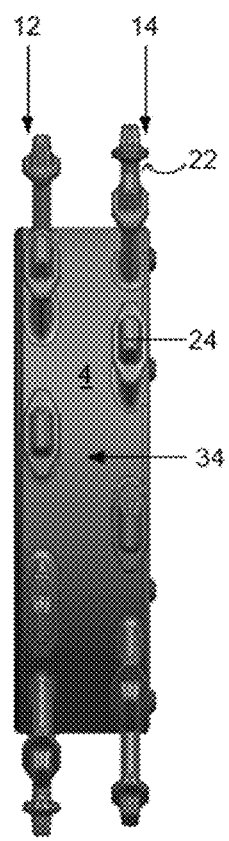

The plurality of projections 6 can be offset from one another, and evenly distributed about the outer surface 4 (as best shown in FIGS. 4A-4B). In some embodiments, the plurality of projections 6 comprises a first projection series 12 and a second projection series 14.

With reference to FIGS. 1-2, the projection 6 comprises a stem 16, a ground contacting pad 18, and a ground engaging lug 20, located at the distal end of the projection 6. The plurality of projections 6 provides superior traction in a number of adverse conditions due to the combination of the stem 16, ground contacting pad 18, and ground engaging lug 20.

In conditions of soft or loose turf, the plurality of projections 6 may penetrate an area of soil 10, thus engaging more projections 6 to further increase tractive forces. The open spacing of the projections 6, due to the projections 6 being offset from one another, allow for deeper engagement of objects, such as rocks or branches, allowing the plurality of projections 6 to "climb" over large objects located within an area of turf.

The stem 16 extends perpendicularly from the outer surface 4 of the wheel rim 2. In some embodiments, the stem 16 is substantially rectangular in shape, wherein the length of the stem 16 is greater than its width. In other embodiments, the stem 16 is trapezoidal in shape. It should be understood that the stem 16 can be formed into any shape and made of any material sufficient to maintain the wheel rim 2 above an area of turf 10, and also to obtain access to the soil with minimal disturbance or damage thereto. It should also be understood that the length of the stem 16 can change as a function of height of the turf that the wheel is intended to operate.

In some embodiments, the ground contacting pad 18 extends perpendicularly outward from the stem 16, thus creating an overhang 22. In other embodiments, the ground contacting pad 18 is integrally formed with the stem 16, and thus does not create an overhang.

The ground contacting pad 18 prevents turf material from slowly working up the sides of the stem 16. By preventing or minimizing turf material from building up on or around the stem 16, turf material is prevented from building up on or against the wheel rim 2, further preventing the turf wheel 100 from becoming impacted with turf material. This allows the low impact turf wheel 100 to perform consistently through a range of conditions, provides resistance to build-up and reduces maintenance required of the user, and eliminates unsightly clumps of turf material left behind in an area of turf.

The ground engaging lug 20 abuttingly engages with the ground contacting pad 18. In some embodiments, the ground engaging lug 20 is substantially trapezoidal in shape. It should be understood that the ground engaging lug 20 can be any size, shape, or depth that will allow penetration of an area of soil to provide high grip capacity. The shape and the depth of the ground engaging lug 20 can be a function of grip and soil type. For example, in hard, dense soils, the ground engaging lug 20 can be of a slender profile in order to penetrate the soil and provide mechanical engagement with it, and in soft or wet/moist soils, the ground engaging lug 20 can be of a broader profile so to mechanically engage a wider area of ground material.

It should also be understood that the ground engaging lug 20 can be formed of the same or different material than that which comprises the stem 16. In some embodiments, the ground engaging lug 20 is formed of over-molded rubber. In some embodiments, the ground engaging lug 20 is integrally formed with the stem 16. In some embodiments, the ground engaging lug 20 further includes a lug face 24. It should be understood that the lug face 24 can include a square, circular, triangular, rectangular, or most any other shaped frontal cross-section.

Figure 3:
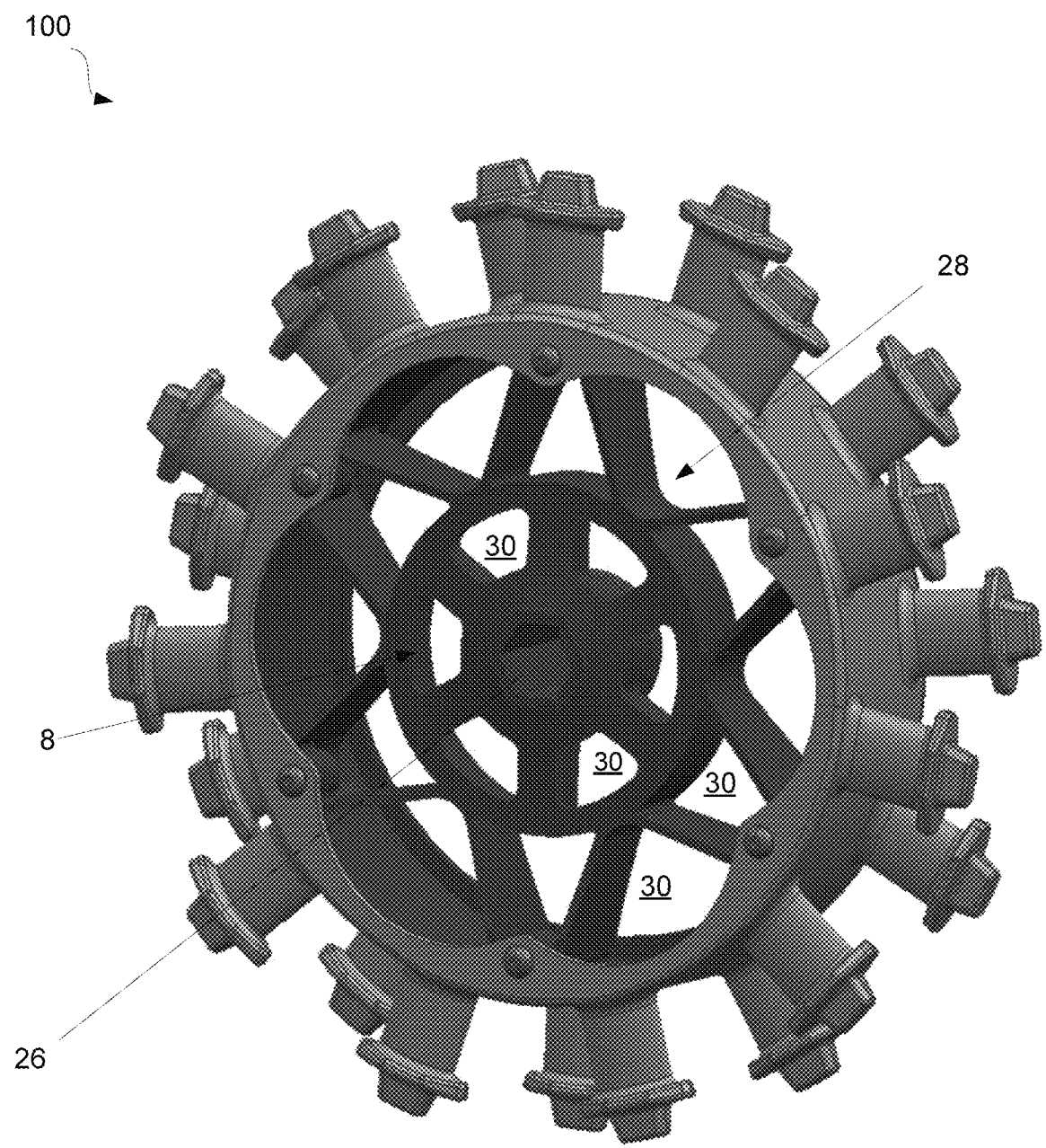
FIG. 3 is a partial rotated view of an illustrative embodiment of the disclosed technology.

With references to FIGS. 1, 3, and 4A, the hub 8 is shown. In some embodiments, the hub 8 comprises a central portion 26 and a branched network 28. In some embodiments, the hub 8 optionally includes a plurality of apertures 30. The central portion 26 provides for mounting of the turf wheel 100 to a frame of a wheeled apparatus. For example, the central portion 26 is configured for receiving and operatively connecting the hub 8 to a drive shaft, drive mechanism (e.g. motion drive such as a gear motor), wheel axle, or the like, (the previous list of which are not shown in figures). In other embodiments, the hub 8 may only include the central portion 26.

As shown in FIG. 4A, the branched network 28 extends radially outward from the central portion 26 and is affixed to the wheel rim 2. In some embodiments, the branched network 28 comprises a web-like structure. In some embodiments, the branched network 28 includes a plurality of apertures 30. The branched network 28 of the turf wheel 100 further reduces material costs and provides a light-weight wheel.

With reference to FIGS. 4-5, the turf wheel 100 provides an annular tread portion 32 (as represented by dashed lines in FIG. 4A). The annular tread portion 32 comprises the entire circumferential surface area encompassed by the ground contacting pads 18 (which includes the surface area of the ground engaging lugs 20 extending therefrom) and the tread voids 34, (i.e. the combined surface area of the ground contacting pads 18 and the tread voids 34).

The annular tread portion 32 provides a non-continuous tread surface, due to the offset nature of the ground contacting pads 18 (provided by the projections 6) and the presence of the tread voids 34. It will be appreciated that tread voids 34 can include open areas of any suitable size and/or shape and in most any suitable arrangement and/or configuration.

In some embodiments, the ground contacting pads 18 comprise about 30% and the tread voids 34 comprise about 70% of the annular tread portion 32. In some embodiments, the ground contacting pads 18 provide between about 10% to 50% of the annular tread portion 32.

In some embodiments, the turf wheel 100 comprises a contact surface ratio of about 1:3. It should be understood that the contact surface ratio provides the ratio of the ground contacting pads 18 (including the surface area of the ground engaging lugs 20 extending therefrom) in relation to the annular tread 32 portion. The ratio of the surface area of the ground contacting pads 18 is optimized as to leave as little surface as required to support the load on a given soil type, which leads to minimized disruption of the grass stems and underlying turf/soil, as well as being minimally invasive on the turf. In another embodiment, an appropriate contact surface ratio can be established based on the weight and/or mass of the mower, and the expected or actual turf conditions.

Figures 5A, 5B, 5C, 5D:
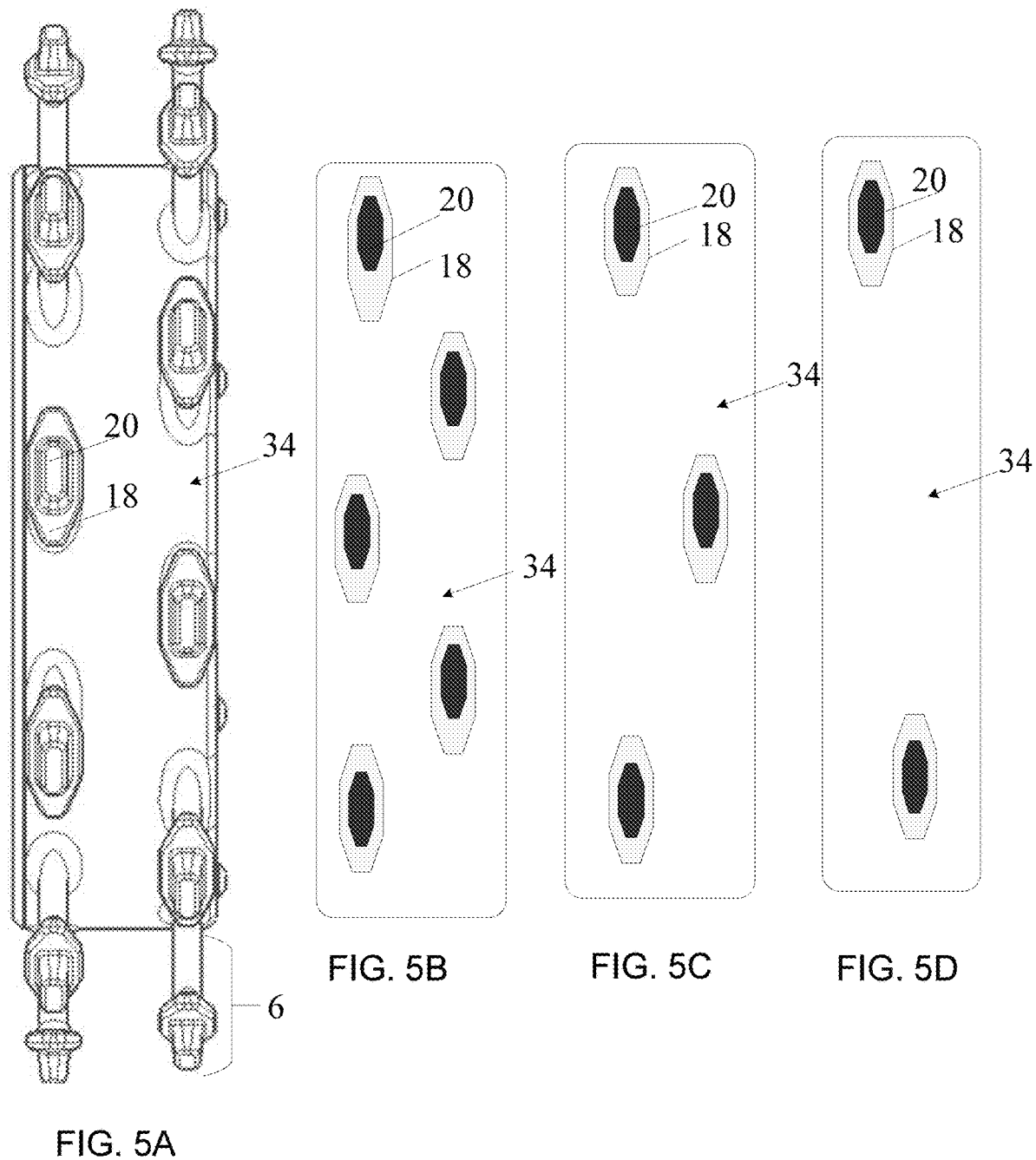
FIGS. 5A-5D are front views of illustrative embodiments of the disclosed technology.

Turning to FIGS. 5A-5D, front views of example embodiments of the disclosed technology are illustrated. The non-continuous tread surface is shown which is provided by the offset positioning of each ground contacting pad 18 (provided by the projections 6) and the presence of the tread voids 34. As best represented in FIGS. 5A and 6A-B, the tread voids 34 can include open areas of any suitable size and/or shape and in most any suitable arrangement and/or configuration.

In some embodiments, the ground contacting pads 18 comprise between about 10% to 50% of the annular tread portion 32. In another embodiment, the ground contacting pads 18 comprise between about 10% to 40% of the annular tread portion 32. In another embodiment, the ground contacting pads 18 comprise about 30%-35% of the annular tread portion 32.

Figure 6A:
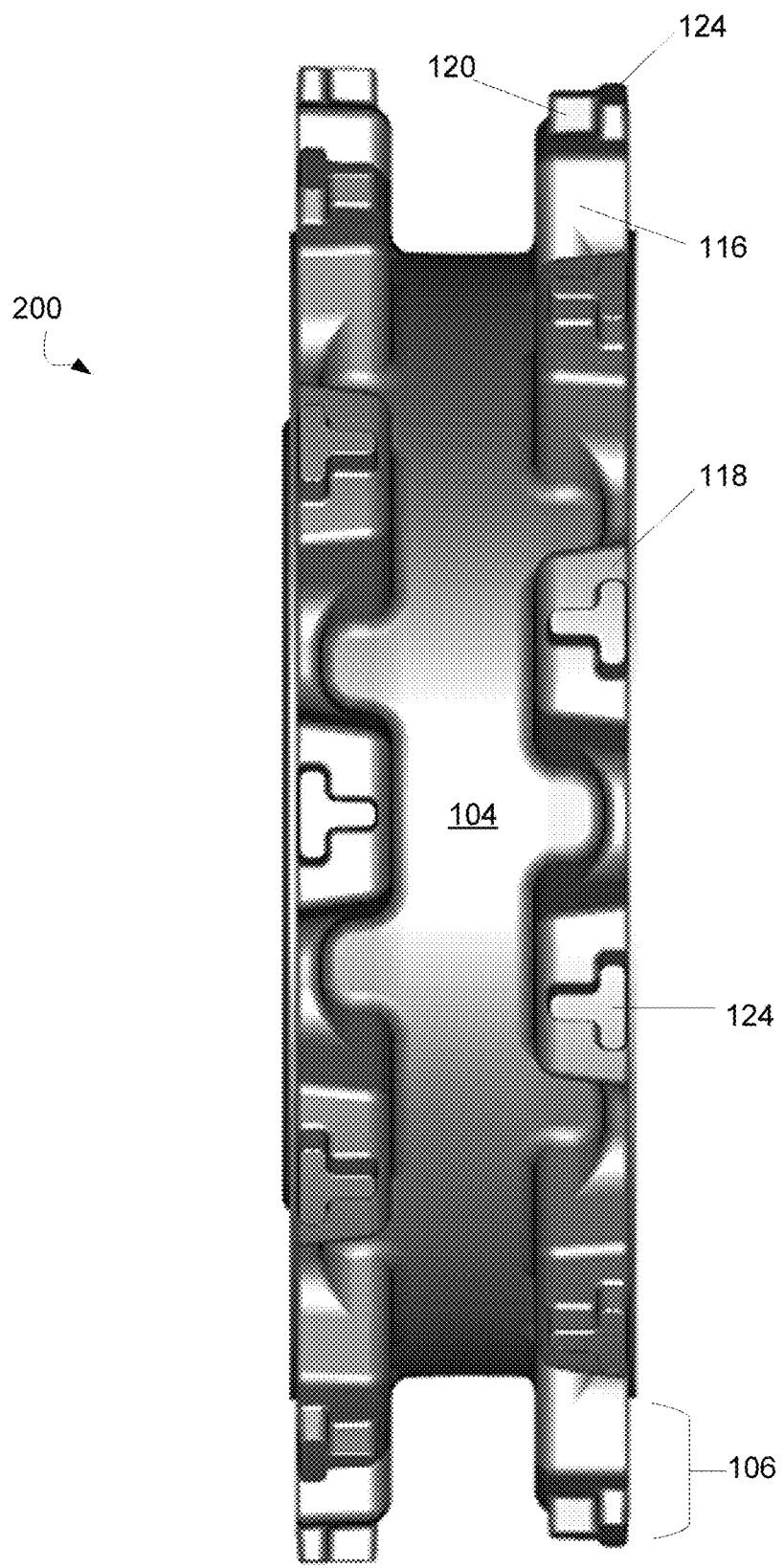
FIGS. 6A-B are side views of an illustrative embodiment of the disclosed technology.
Figure 6B:
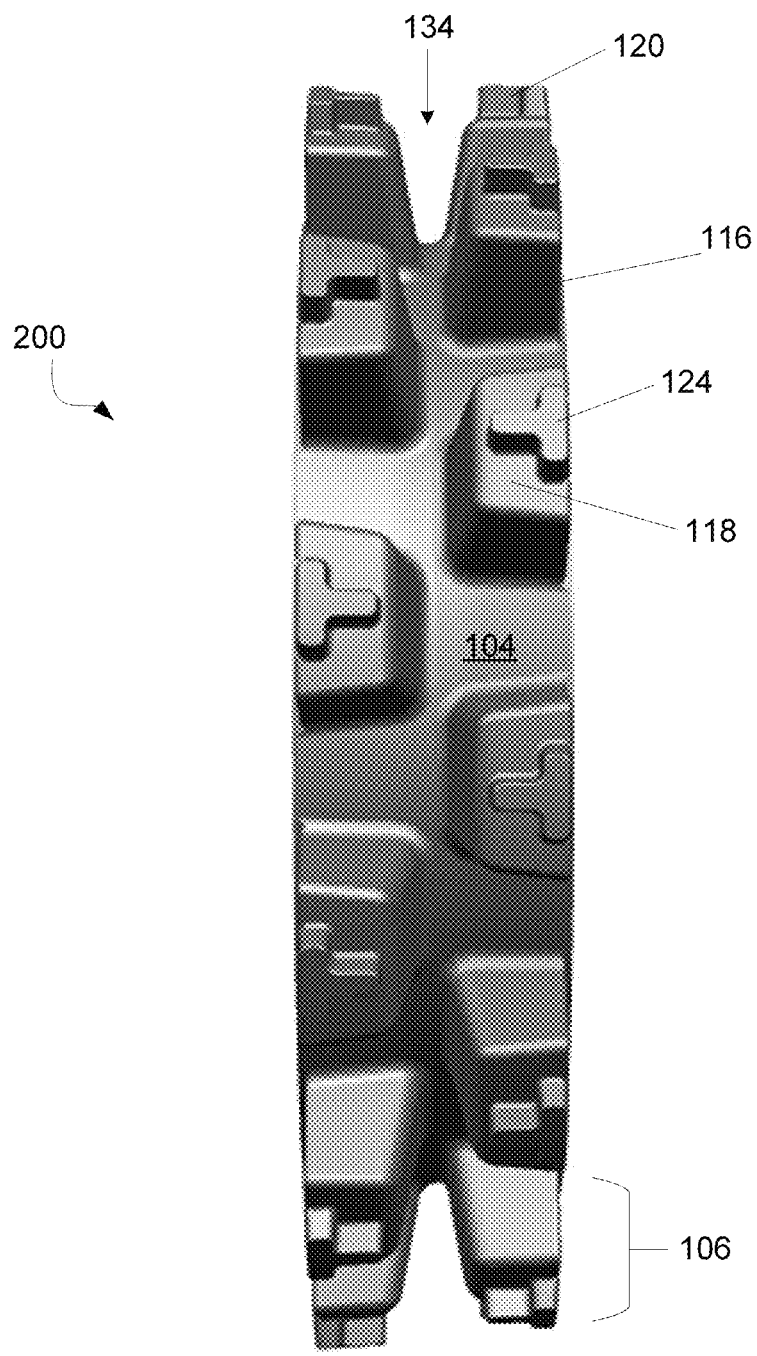
Figure 6C:
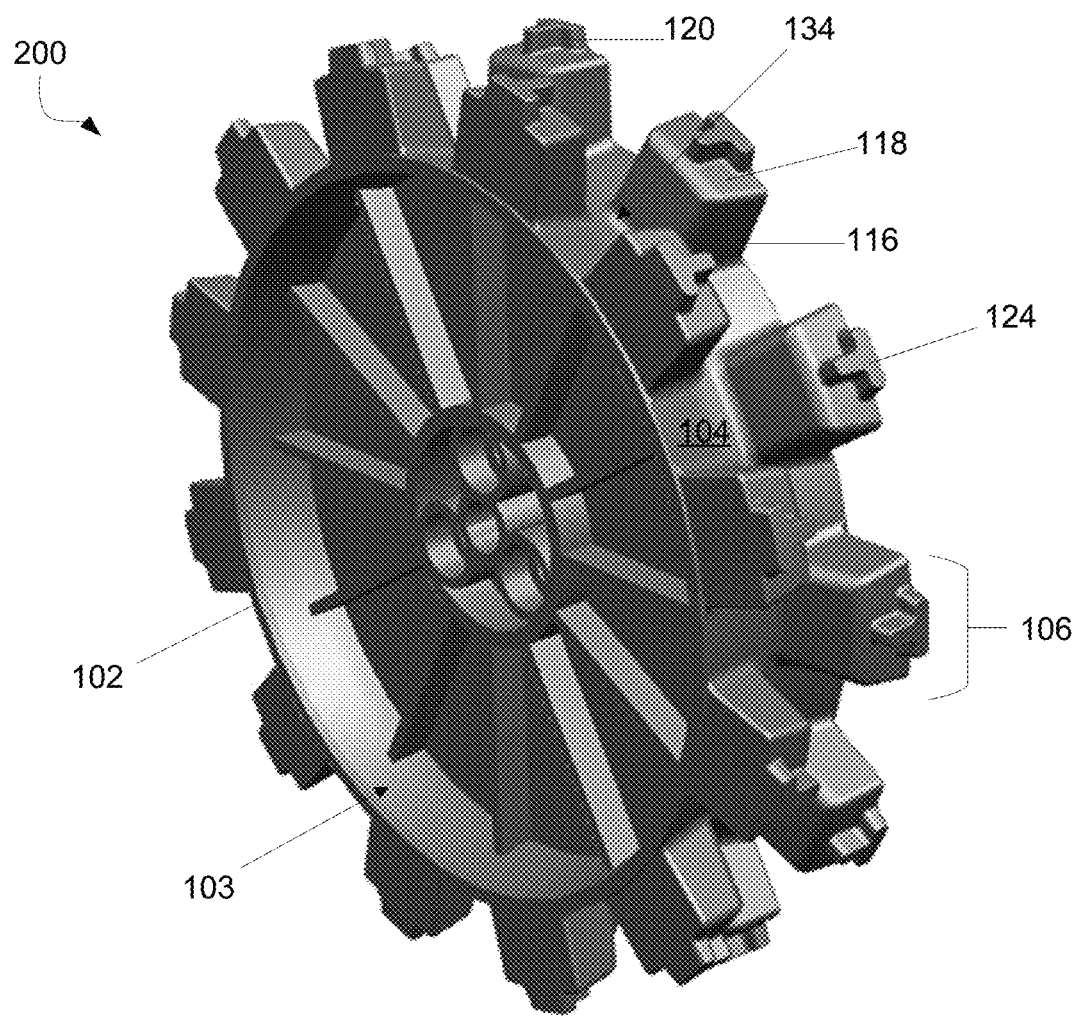
FIG. 6C is a partially rotated view of an illustrative embodiment of the disclosed technology.

With reference to FIGS. 6A-C, alternative embodiments of a turf wheel 200 is provided, wherein like parts have like numerals to those in FIGS. 1-5, plus 100. The low impact turf wheel 200 comprises a wheel rim 102 (not shown in figures) having an inner surface 103 (not shown in figures), an outer surface 104, and a plurality of projections 106, wherein the plurality of projections 106 extend radially outward from the outer surface 104.

The projection 106 comprises a stem 116 and a ground engaging lug 120, wherein the ground engaging lug 120 includes a lug face 124. The configuration of the stem 116 and the ground engaging lug 120 provides increased surface area in order to prevent the turf wheel 200 from sinking into wet, moist, or muddy soil while traversing the ground/terrain, and yet still provides superior traction.

The stem 116 extends perpendicularly from the outer surface 104. In some embodiments, the stem 116 is substantially rectangular in shape, wherein the length of the stem 116 is greater than its width. In other embodiments, the stem 116 is trapezoidal in shape.

In some embodiments, the ground engaging lug 120 is T-shaped. The T-shaped lug includes a transverse rib to increase tractive force in the tangential direction. In some embodiments, the T-shaped lug provides an additional projected surface area so as to engage with the turf and increase traction in wet or moist areas, without causing the turf wheel to sink or ultimately become stuck. However, it should be understood that the ground engaging lug 120 can be of most any shape that provides increased tractive force to allow the turf wheel 200 to traverse wet, moist or muddy soil/terrain.

The stem 116 further comprises a ground contacting pad 118, wherein the ground engaging lug 120 extends radially outward from the ground contacting pad 118, and wherein the ground engaging lugs 120 further comprise a lug face 124. The ground contacting pad 118 supports the mass of the wheeled apparatus without sinking into the soil.

The ground engaging lugs 120 may penetrate or sink into the soil or ground/terrain and mechanically engage it for tractive purposes. The ground contacting pads 118 provide adequate support to the turf wheel 200 in order to maintain the outer surface 104 above an area of turf without sinking. In wet, moist, or muddy soil conditions, the ground contacting pad 118 provides adequate support to the turf wheel 200 in order to maintain the outer surface 104 above an area of turf without sinking, becoming stuck or fixed within the wet, moist or muddy soil, or limiting a decrease in traction or efficiency.

In some embodiments, the ground contacting pads 118 comprise less than about 75% of the annular tread portion 32. In other embodiments, the ground contacting pads 118 comprise less than about 70% of the annular tread portion 32, in other embodiments, less than about 50% of the annular tread portion 32, and in other embodiments, less than about 40% of the annular tread portion 32.

In some embodiments, the ground contacting pads 118 comprise between about 30% to 50% of the annular tread portion 32. In some embodiments, the ground contacting pads 118 comprise between about 30% to 35% of the annular tread portion 32, in other embodiments, between about 35% to 45% of the annular tread portion 32, and in other embodiments, about 45% to 50% of the annular tread portion 32.

With reference to FIGS. 7-10, in yet another aspect of the present technology, a wheel cleaning system 300 is provided. The wheel cleaning system 300 comprises a frame 310, at least one turf wheel 312, and a turf wheel scraper assembly 314. The wheel cleaning system 300 is adapted to continuously remove debris from a turf wheel during rotation, and prevents the formation of a continuous band of material (for example, mud, loose turf clippings, or the like) that can build up and form around the circumference of the turf wheel during various operating conditions. For example, the wheel cleaning system 300 removes soil, grass, and other lawn debris (i.e. "build-up") that may stick or become stuck between the rows of wheel projections before it can be pushed further towards the inner circumference of the wheel. By maintaining a clear channel through this build-up, once the turf/soil conditions dry, the remaining build-up between the projections can easily break free and dislodge completely from the wheel.

Without the present technology, such build-up will negatively affect the performance of wheel. For example, if build-up becomes packed in between the projections, even once dry, such build-up does not free itself. Such negative affects include, but are not limited to, (i) adding additional, undesired mass to the vehicle, (ii) the closing off the area between the ground contacting pads, which therefore reduces or eliminates the benefits of the low impact turf wheel design, and/or (iii) allows for build-up that completely fills in around the lugs, thus preventing mechanical engagement with the soil, and therefore reducing traction.

The frame 310 is provided by a non-rotating member of a wheeled apparatus. In some embodiments, the frame 310 is a vehicle chassis, or other structure of the wheeled apparatus which remains stationary relative to the turf wheel 312. Examples of a wheeled apparatus in accordance with the present disclosure, include, but are not limited to, mowers, riding mowers, zero-radius-turning lawn mowers, autonomous mowers, agriculture equipment, and/or the like.

At least one turf wheel 312 is mounted to the frame 310. The turf wheel 312 is connected or mounted to the frame by any conventional means, such as, for example, a drive shaft or axle of a wheeled apparatus. The turf wheel 312 provides a non-continuous tread, which comprises a plurality of projections 106 and a plurality of tread voids 134 (as previously described in FIGS. 6A-C). In some embodiments, each projection comprises a stem 116, a ground contacting pad 118, and a ground engaging lug 120.

With reference to FIGS. 7-8, the turf wheel scraper assembly 314 comprises a turf wheel scraper 316 and an attachment mechanism 318. The turf wheel scraper assembly 314 removes any debris that may become lodged, form on, or adhere to the turf wheel during a single rotation about its axis. By removing any such debris immediately and continuously from the turf wheel, build-up around or on the projections of the turf wheel, and/or around the circumference of the wheel rim itself, is eliminated, minimized, or reduced.

Figure 7A:
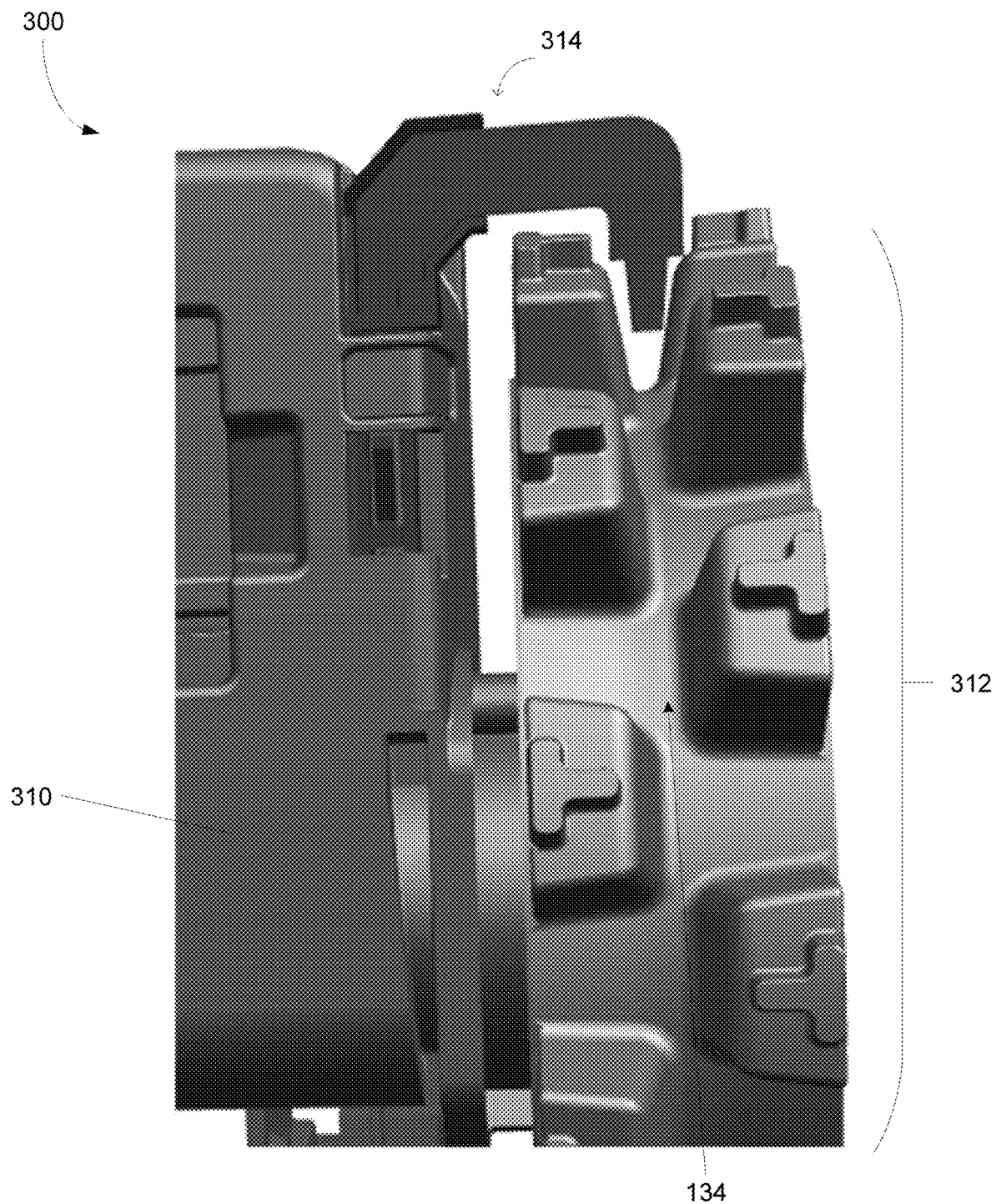
FIGS. 7A-B are side views of an illustrative embodiment of the disclosed technology.
Figure 7B:
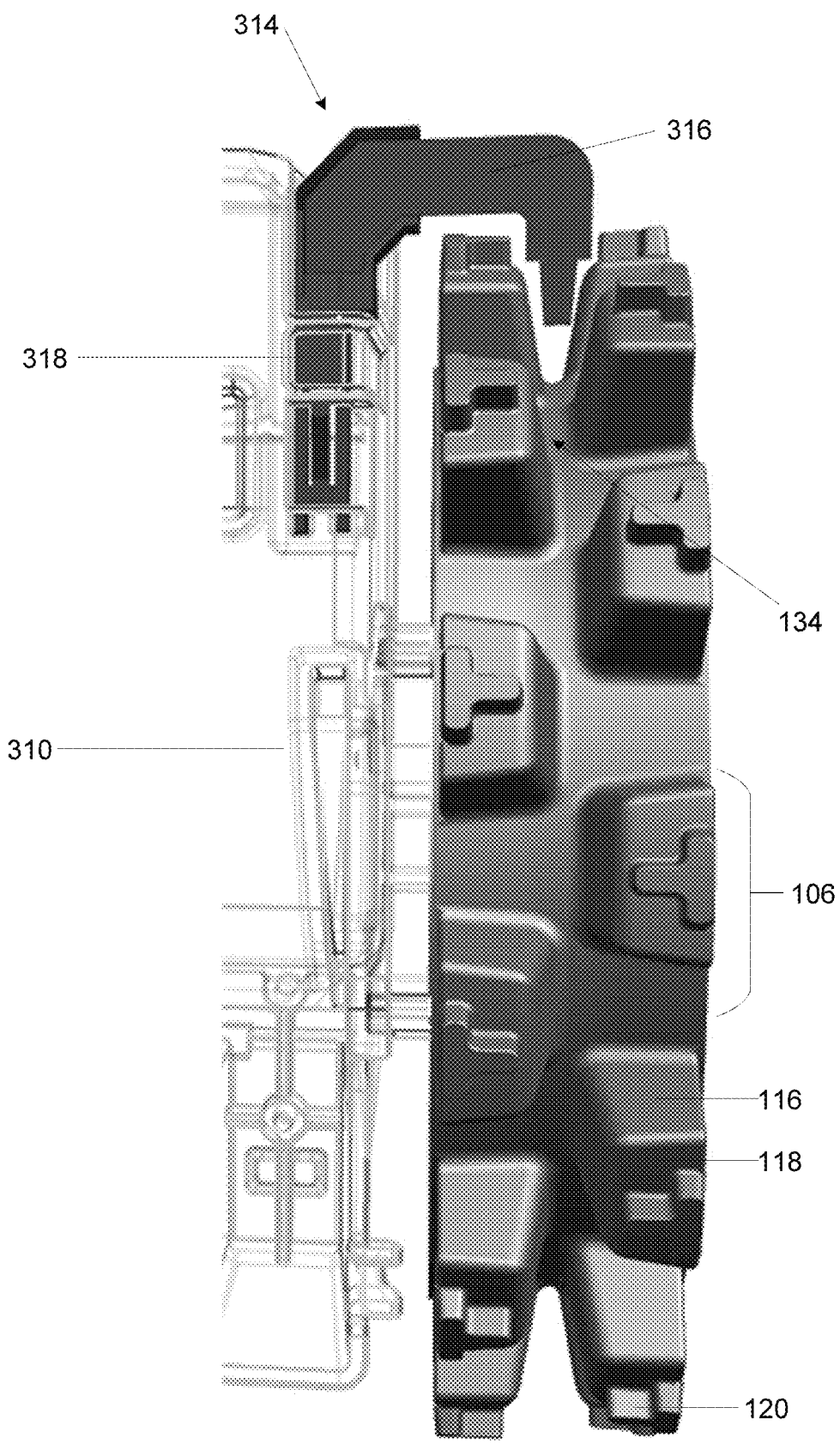
Figure 7C:
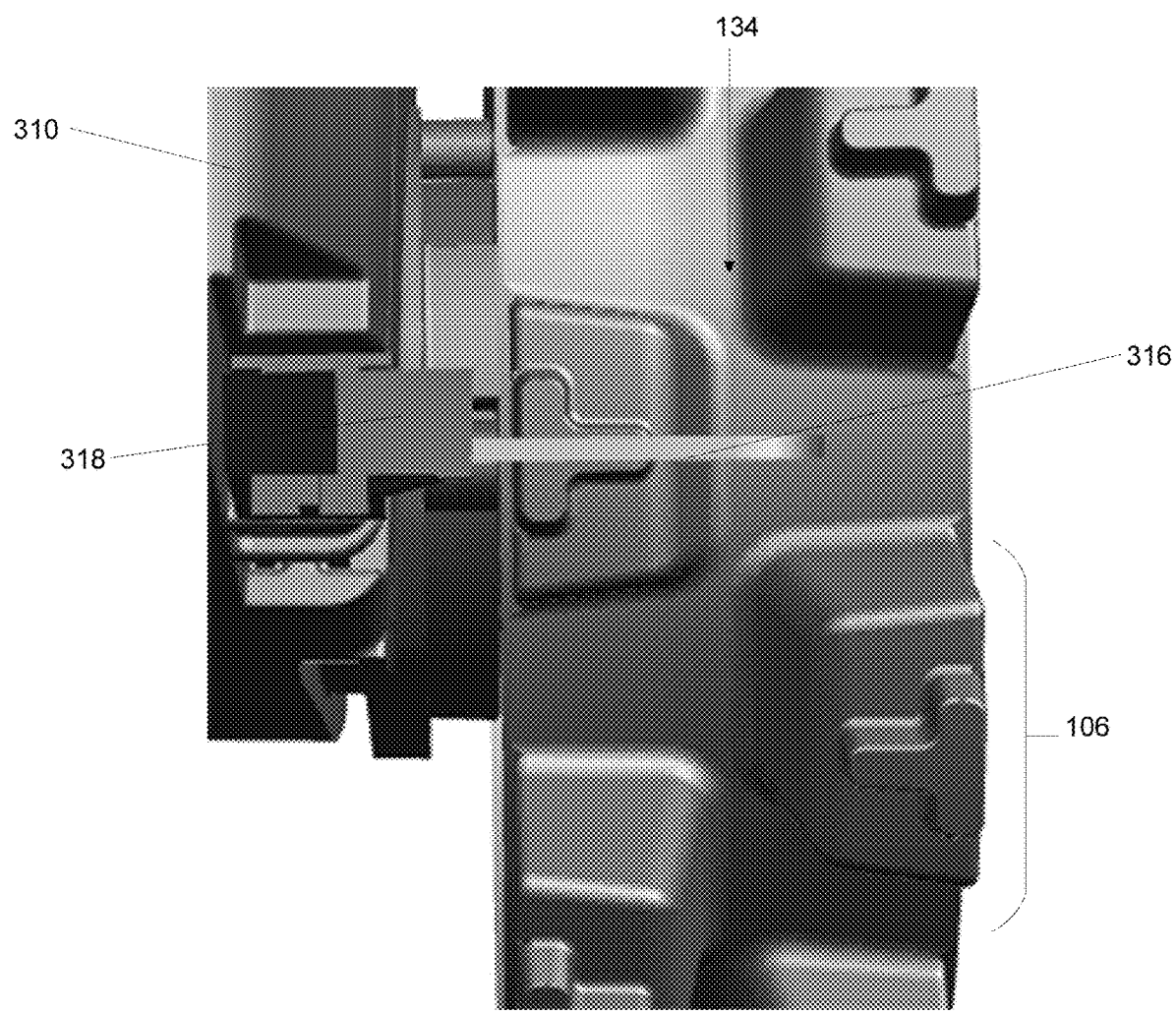
FIG. 7C is an overhead view of an illustrative embodiment of the disclosed technology.
Figure 9:
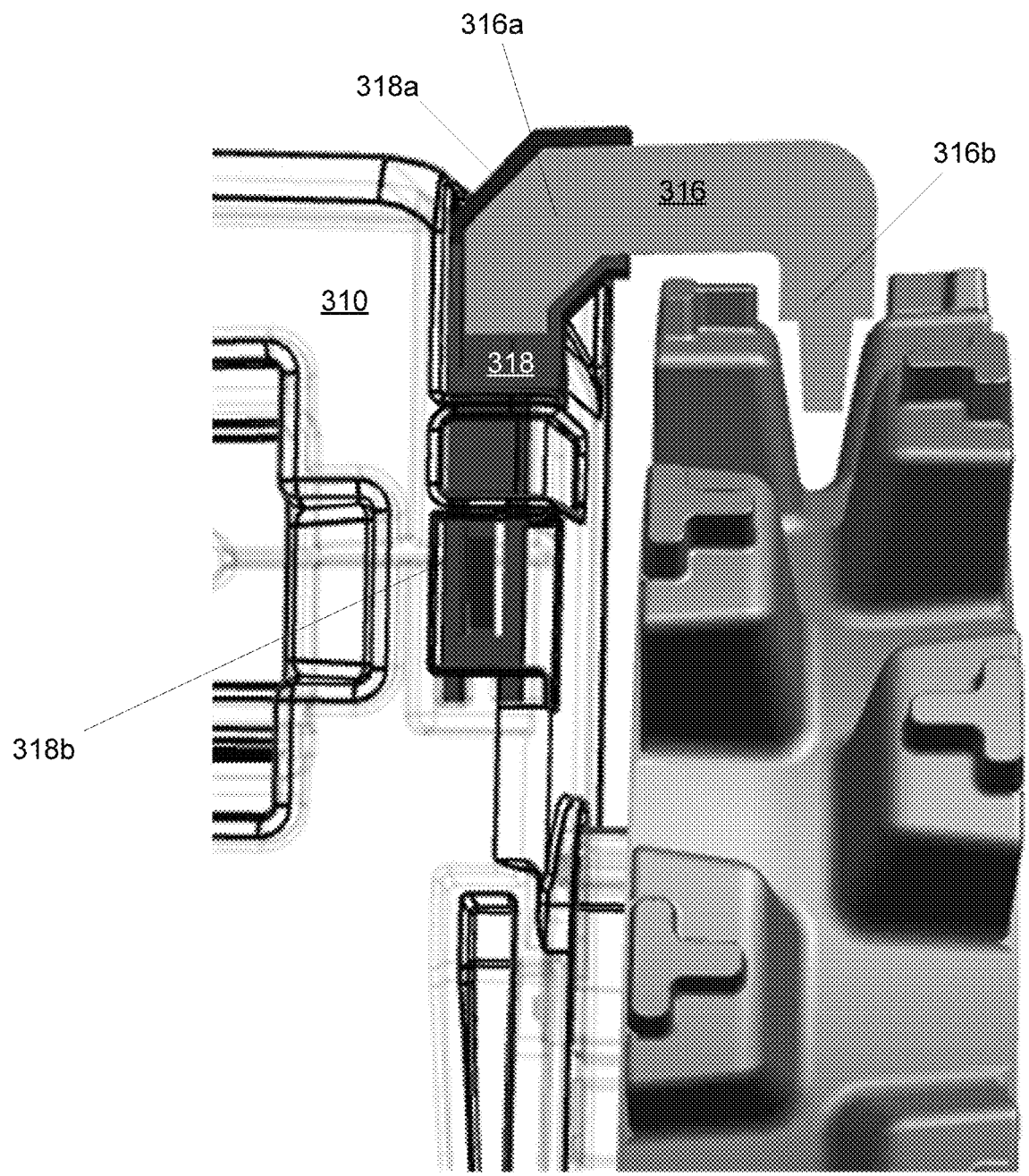
FIG. 9 is a side view of an illustrative embodiment of the disclosed technology.
Figure 10:
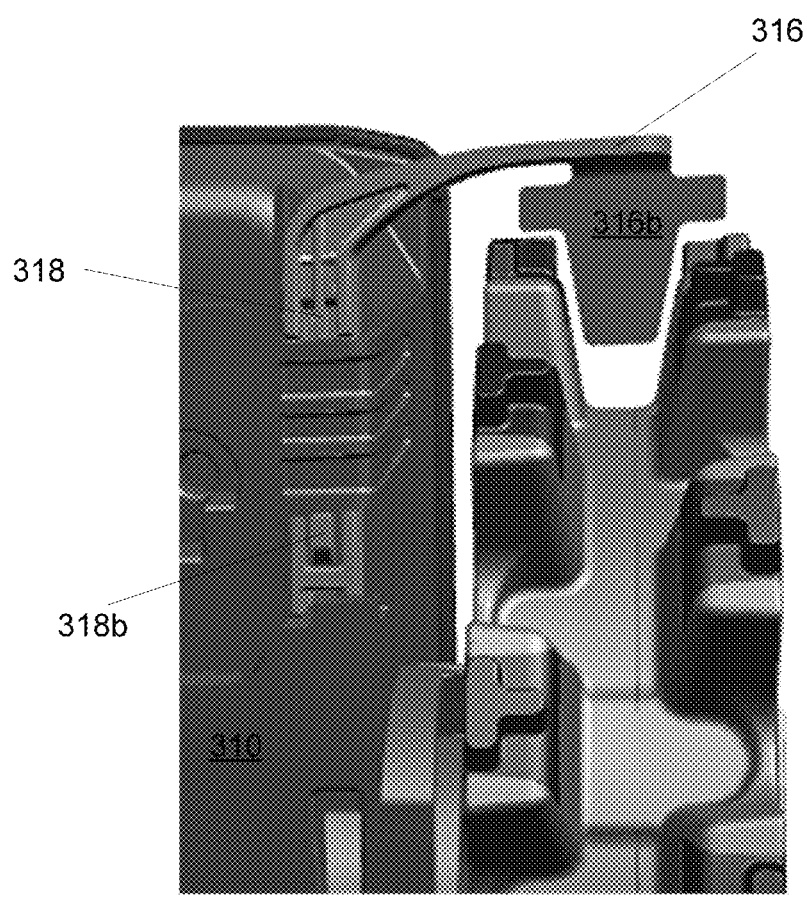
FIG. 10 is a side view of an illustrative embodiment of the disclosed technology.

The turf wheel scraper assembly 314 is removably attachable to the frame 310. As shown in FIGS. 7B, 9, and 10, when attached to the frame 310, the turf wheel scraper assembly 314 is held stationary relative to the rotation of the turf wheel 312. In some embodiments, the turf wheel scraper assembly 314 is mounted or affixed to the frame 310. It should be understood that the turf wheel assembly 314 can be mounted or affixed to the frame 310 by any conventional means. In some embodiments, the turf wheel scraper assembly 314 is adapted to snap into the frame or chassis.

The turf wheel scraper 316 is adapted to continuously remove debris from the turf wheel 312 during rotation, where the turf wheel 312 spins or rotates relative to the turf wheel scraper 316. The turf wheel scraper 316 is generally curved and is shaped to allow the turf wheel to rotate, yet remains in close proximity to the plurality of projections located on the turf wheel to remove any debris located on or about around the circumference of the turf wheel during operation.

As shown best in FIGS. 7A-B and FIGS. 9-10, the turf wheel scraper 316 is configured to pass through the non-continuous tread. The turf wheel scraper 316 is shaped as to contour the plurality of projections that are located on the turf wheel. The turf wheel scraper 316 is shaped such that it is able to pass over and around the ground engaging lugs 120, and down the interior portion of the stem 116 of the projection 106 located on the turf wheel during rotation. It should be understood that the turf wheel scraper 316 can be shaped as to contour any size, shape, or configuration of the projections 106.

As can be seen in FIGS. 8B-E, the turf wheel scraper 316 is provided. The turf wheel scraper 316 can be made of any material sufficient to provide enough rigidity to easily remove any debris or build-up, yet flexible enough to withstand cycles of flexing during rotation of the turf wheel without fracturing or breaking. In some embodiments, the turf wheel scraper 316 is comprised of a high elasticity plastic, such as, polypropylene, polyethylene, or the like.

In some embodiments, the turf wheel scraper 316 follows the outer diameter of the ground engaging lugs 120, and extends partially into the channel between the projections 106. The turf wheel scraper 316 is located at or near the rear portion of the turf wheel, so as to be in the primary direction of travel (i.e. forward), where newly picked up debris can be removed quickly before it can enter into the surrounding structure of the vehicle.

In some embodiments, the turf wheel scraper 316 provides a fixed end 316a and a tapered end 316b. The turf wheel scraper 316 extends perpendicularly from the frame 310 and is positioned such that it passes over the plurality of projections 106, where the tapered end 316b extends into and between the plurality of tread voids 134 (as best shown in FIGS. 7A-C, and FIGS. 9-10). In some embodiments, the turf wheel scraper 316 is configured to contour the ground contacting pad 118 and the ground engaging lug 120 (as previously described in FIGS. 6A-C). In some embodiments, the turf wheel scraper 316 extends essentially to the surface of the wheel rim 104.

The turf wheel scraper assembly 314 further provides an attachment mechanism 318. The attachment mechanism 318 is adapted to be mounted to the frame and couples the turf wheel scraper 316 to the frame 310, thus allowing the turf wheel scraper 316 to remain attached to the frame 310 during rotation of the turf wheel 312. In some embodiments, the turf wheel scraper 316 is glued or fused to the attachment mechanism 318. In other embodiments, the turf wheel scraper 316 is fastened to the attachment mechanism 318.

It should be understood that the attachment mechanism 318 can be made of any material sufficient to provide the required strength to be properly mount the turf wheel scraper 316 to the frame 310 during operation. In some embodiments, the turf wheel scraper 316 is made of the same or different material than that of the attachment mechanism 318.

Figure 8A:
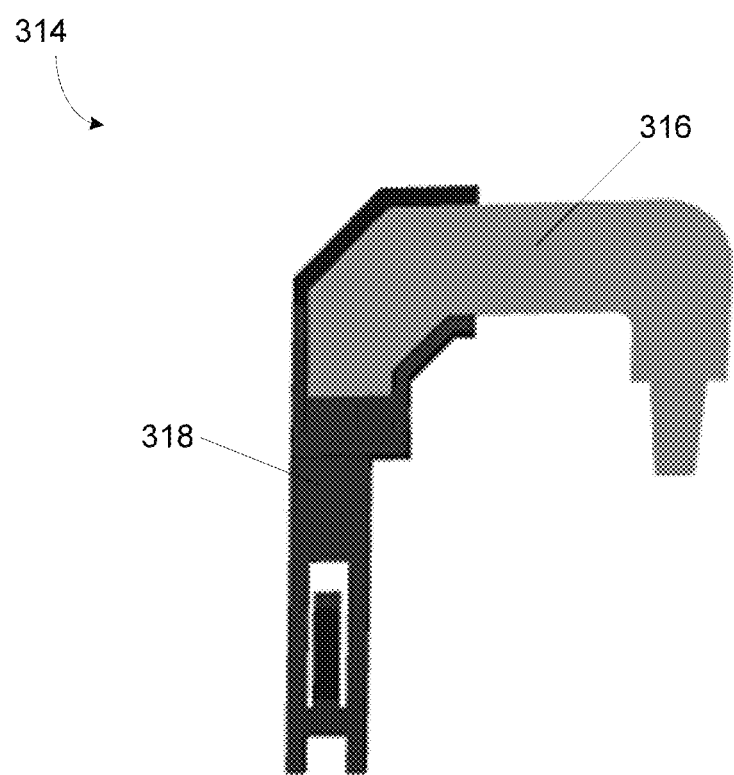
FIGS. 8A-E are isometric views of an illustrative embodiment of the disclosed technology.
Figure 8B:
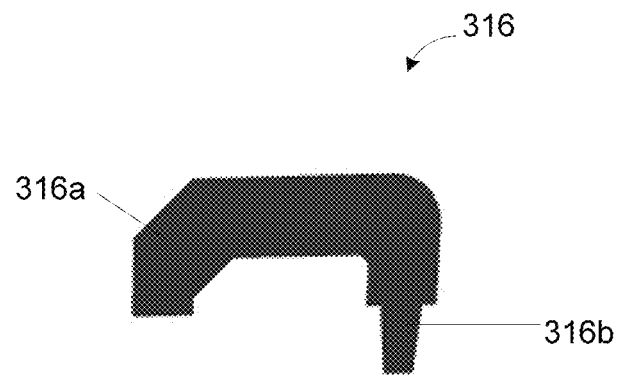
Figure 8C:
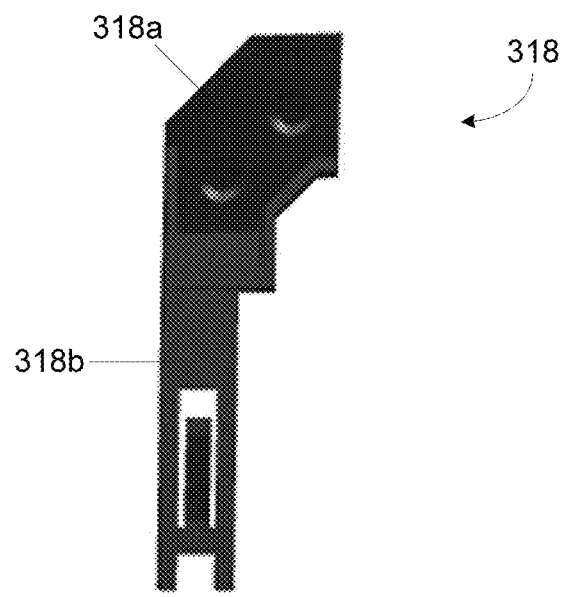

With reference to FIG. 8C, the attachment mechanism 318 comprises a curved end 318a and a mounted end 318b. The curved end 318a is configured in such a manner as to mirror, or be identical to, the shape of the fixed end 316a of the turf wheel scraper 316, so as to couple the turf wheel scraper 316 to the attachment mechanism 318 (as best shown coupled together in FIG. 8A). The mounted end 318b extends from the curved end 318a and is generally straight. However, the mounted end 318b can be of any shape or configuration sufficient to be mounted into or affixed onto the frame 310.

Figure 8D:
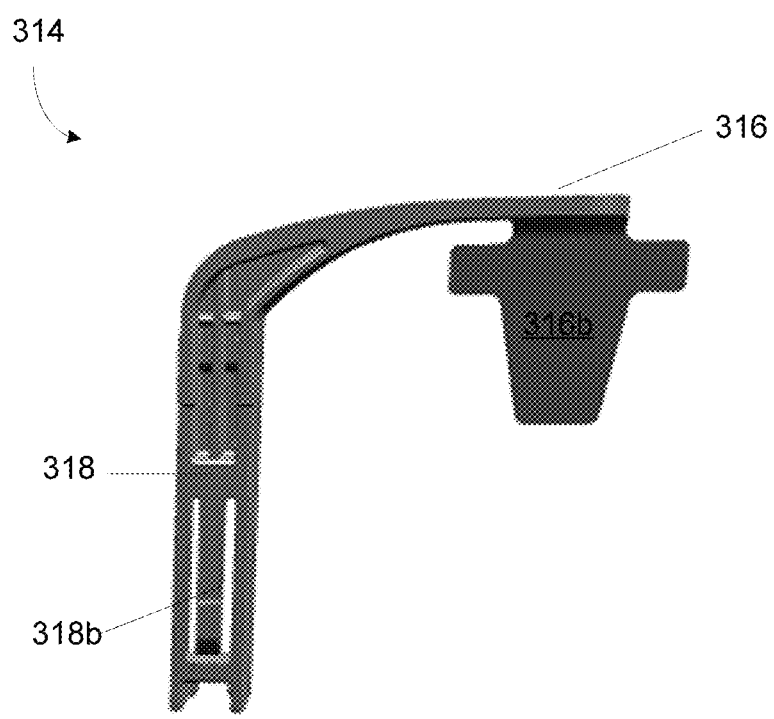
Figure 8E:
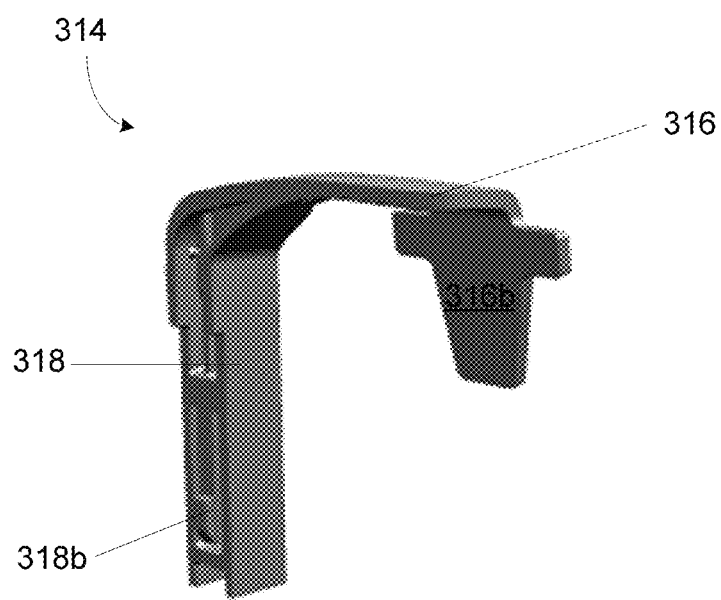

In some embodiments, the wheel scraper assembly 314 is formed of a single piece (as best shown in FIGS. 8D-8E), where the turf wheel scraper 316 and the attachment mechanism 318 are one contiguous piece. In such embodiments, the tapered end 316b extends perpendicularly from the turf wheel scraper 316 portion. The turf wheel scraper 316 is designed to be flexible enough so as to bend out of the way if a solid object becomes lodged in the wheel. In such instances, the tapered end 316b can continuously "pick" at the lodged object or build-up over multiple rotations in an effort to dislodge or remove it, which also prevents the wheel scraper assembly 314 from stopping the rotation of the turf wheel, or ultimately breaking the wheel scraper assembly or chassis components.

As shown in FIGS. 9-10, the mounted end 318b is mounted onto the frame 310. In some embodiments, the mounted end 318b may comprise a clip or other device which snaps into the frame 310, which is adapted to receive such end, and can be easily fastened or removed.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A wheel cleaning system, comprising a frame provided by a wheeled apparatus;
   at least one turf wheel mounted to the frame;
   a turf wheel scraper assembly, the turf wheel scraper assembly having a turf wheel scraper and an attachment mechanism,
   wherein the attachment mechanism is adapted to be mounted to the frame, and couples the turf wheel scraper to the frame;
   wherein the at least one turf wheel comprises a non-continuous tread having a plurality of projections and a plurality of tread voids; and
   wherein each projection comprises a stem, a ground contacting pad, and a ground engaging lug.

2. The wheel cleaning system of claim 1, wherein the turf wheel scraper assembly is configured to continuously remove debris from the turf wheel during rotation of the wheel.

3. The wheel cleaning system of claim 1, wherein the turf wheel scraper is configured to contour the plurality of projections.

4. The wheel cleaning system of claim 1, wherein the turf wheel scraper is configured to contour the ground contacting pad and the ground engaging lug.

5. The wheel cleaning system of claim 1, wherein the turf wheel scraper is shaped such that it is able to pass over and around the ground engaging lug, and down an interior portion of the stem during rotation of the wheel.

6. A method of operating a wheel cleaning system comprising:
   providing a wheel cleaning system having
      a frame provided by a wheeled apparatus,
      at least one turf wheel mounted to the frame,
      a turf wheel scraper assembly, the turf wheel scraper assembly having a turf wheel scraper and an attachment mechanism,
      wherein the attachment mechanism is adapted to be mounted to the frame, and couples the turf wheel scraper to the frame,
      wherein the at least one turf wheel comprises a non-continuous tread having a plurality of projections and a plurality of tread voids, and
      wherein each projection comprises a stem, a ground contacting pad, and a ground engaging lug;
   mounting the attachment mechanism to the frame;
   coupling the turf wheel scraper to the frame using the mounted attachment mechanism;
   rotating the turf wheel with respect to the turf wheel scraper.

7. The method of operating a wheel cleaning system of claim 6, further comprising using the turf wheel scraper to remove debris that may become lodged, form on, or adhere to the turf wheel.

8. The method of operating a wheel cleaning system of claim 6, wherein the frame is provided by a non-rotating member of the wheeled apparatus.

9. The method of operating a wheel cleaning system of claim 6, wherein the turf wheel provides a non-continuous tread having a plurality of projections and tread voids.

10. The method of operating a wheel cleaning system of claim 9, wherein the turf wheel scraper passes over the plurality of projections.

11. The method of operating a wheel cleaning system of claim 9, wherein the turf wheel scraper extends into and between the plurality of tread voids.

12. The method of operating a wheel cleaning system of claim 9, further comprising passing the turf wheel scraper through the non-continuous tread.

13. The method of operating a wheel cleaning system of claim 7, wherein the turf wheel provides a non-continuous tread having a plurality of projections and tread voids.

14. The method of operating a wheel cleaning system of claim 13, wherein the turf wheel scraper passes over the plurality of projections.

15. The method of operating a wheel cleaning system of claim 13, wherein the turf wheel scraper extends into and between the plurality of tread voids.

16. The method of operating a wheel cleaning system of claim 13, further comprising passing the turf wheel scraper through the non-continuous tread.

* * * * *